US012755284B1

(12) United States Patent
Bernstein et al.

(10) Patent No.: US 12,755,284 B1
(45) Date of Patent: Oct. 6, 2026

(54) SECURE EMERGENCY RESOURCE AUTHENTICATION SYSTEM AND METHOD

(71) Applicant: UIPCO, LLC, San Antonio, TX (US)

(72) Inventors: Steven Michael Bernstein, San Antonio, TX (US); Mounica Urity, Mountain View, CA (US); Gregory David Hansen, Fuquay Varina, NC (US); Kristina Suniga-Cabrera, San Antonio, TX (US); Nina Schuessler, San Antonio, TX (US); Paul Joseph Astwood, San Antonio, TX (US); Janell Guzman, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/754,739

(22) Filed: Jun. 26, 2024

Related U.S. Application Data

(60) Provisional application No. 63/510,431, filed on Jun. 27, 2023.

(51) Int. Cl.
*G06Q 20/18* (2012.01)
*G06Q 20/32* (2012.01)
*G06Q 20/40* (2012.01)

(52) U.S. Cl.
CPC ....... *G06Q 20/40145* (2013.01); *G06Q 20/18* (2013.01); *G06Q 20/3229* (2013.01)

(58) Field of Classification Search
None
See application file for complete search history.

(56) References Cited

U.S. PATENT DOCUMENTS 12,217,230 B1 * 2/2025 Walker ............... G06Q 20/1085
2003/0046555 A1 * 3/2003 Bradley ........... G06Q 20/40145 713/186
2008/0005578 A1 * 1/2008 Shafir ...................... G07C 9/37 713/186
2009/0029763 A1 * 1/2009 Schwartz ................ G07F 17/32 463/25
2011/0016047 A1 * 1/2011 Wu ......................... G07F 19/20 705/43
2013/0304592 A1 * 11/2013 Willson ................. G06Q 20/18 705/17
2014/0351075 A1 * 11/2014 D'Argenio ......... G06Q 30/0621 705/26.5
2016/0012465 A1 * 1/2016 Sharp ................... G06Q 20/321 705/14.17
2017/0337362 A1 * 11/2017 Arunachalam ......... G06F 21/32
2017/0344990 A1 * 11/2017 Kohli ................. G06Q 20/1085
(Continued)

*Primary Examiner* — William J Jacob
(74) *Attorney, Agent, or Firm* — Plumsea Law Group, LLC

(57) ABSTRACT

A method and system for managing and providing emergency access to one or more secured resources. The embodiments provide a system that authenticates users of an ATM kiosk after the input an access code. The authentication is performed by capture of biometric data and a member-specific passcode. In one example, the biometric data is compared to a reference biometric pattern. Where the system determines the biometric patterns match, a signal approving the request is transmitted from the system to the kiosk, causing the kiosk to release cash funds, a credit card, or a SIM card.

20 Claims, 12 Drawing Sheets

(56) References Cited

U.S. PATENT DOCUMENTS

| | | | | |
|---|---|---|---|---|
| 2019/0066073 | A1* | 2/2019 | Yen | G06Q 30/016 |
| 2020/0005263 | A1* | 1/2020 | Arora | G07F 19/207 |
| 2020/0202319 | A1* | 6/2020 | Forutanpour | G07F 9/001 |
| 2020/0234300 | A1* | 7/2020 | Vukich | G06Q 20/3552 |
| 2021/0035400 | A1* | 2/2021 | Flynn | G07F 11/54 |
| 2021/0081937 | A1* | 3/2021 | Yaqub | G06Q 20/40145 |
| 2022/0058601 | A1* | 2/2022 | Yaqub | G06Q 20/3829 |
| 2022/0114854 | A1* | 4/2022 | Forutanpour | G06Q 20/18 |
| 2022/0237623 | A1* | 7/2022 | Perlman | G06V 40/55 |
| 2022/0398901 | A1* | 12/2022 | Vazquez | G06V 40/18 |
| 2025/0045749 | A1* | 2/2025 | Sivakolunthu | G06Q 20/3223 |
| 2025/0054364 | A1* | 2/2025 | Arikat | G07F 19/203 |

* cited by examiner

SECURE EMERGENCY RESOURCE AUTHENTICATION SYSTEM AND METHOD

CROSS-REFERENCE TO RELATED APPLICATION

This application claims the benefit of U.S. Provisional Patent Application Ser. No. 63/510,431 filed on Jun. 27, 2023 and titled "Secure Emergency Resource Authentication System and Method", the disclosure of which is incorporated by reference herein in its entirety.

TECHNICAL FIELD

The present disclosure generally relates to providing access to essential resources during an emergency, and in particular to a mechanism by which to access funds and/or SIM cards in different locations using token-less authentication of an authorized account holder.

BACKGROUND

Financial institutions provide credit cards and debit cards to consumers to enable consumers to access credit and/or money on account. However, credit cards and debit cards, as well as identification cards and other personal items, are sometimes lost or stolen. Furthermore, in scenarios where a person is in away from their home, it can be difficult to pull together the resources needed to accommodate the loss. In some cases, cellular phones or other communication devices can also be lost or stolen, leaving the person vulnerable and unable to reach loved ones, particularly in today's cell phone-dependent society. Replacing such items or simply being able to access sufficient resources to return home without their identification or money becomes a difficult challenge.

There is a need in the art for a system and method that addresses the shortcomings discussed above.

SUMMARY

In one aspect, a computer-implemented method of providing emergency access to a secured resource. The method includes a first step of receiving, at a remote server and from a computing device for a kiosk associated with a financial institution, a first biometric pattern, and a second step of accessing, via the server and in response to receiving the first biometric pattern, a second biometric pattern stored in a member record. A third step includes determining, at the server, the first biometric pattern is sufficiently similar to the second biometric pattern so as to be classified as a match. In addition, a fourth step includes transmitting, from the server and in response to determining there is a match, a first signal to the kiosk computing device, the first signal authorizing the kiosk to release the secured resource, the secured resource including one of cash funds, a credit card, and a Subscriber Identity Module (SIM) card.

In another aspect, a computer-implemented method of providing emergency access to a secured resource can include a first step of transmitting, from a computing device for a kiosk associated with a financial institution to a remote server, a first biometric pattern, and a second step of receiving, from the remote server and at the computing device, a first signal authorizing the kiosk to release the secured resource based on the first biometric pattern matching a second biometric pattern stored in a member account, the secured resource including one of a credit card and a Subscriber Identity Module (SIM) card. A third step can include automatically registering (via the computing device or remote server) the secured resource to the member account associated with the first biometric pattern, and a fourth step includes releasing the registered secured resource from a dispenser slot of the kiosk.

In another aspect, a system for providing emergency access to a secured resource is disclosed. The system comprises a processor and machine-readable media including instructions which, when executed by the processor, cause the processor to (1) receive, at a remote server and from a computing device for a kiosk associated with a financial institution, a first biometric pattern; (2) access, via the server and in response to receiving the first biometric pattern, a second biometric pattern stored in a member record; (3) determine, at the server, the first biometric pattern is sufficiently similar to the second biometric pattern so as to be classified as a match; and (4) transmit, from the server and in response to determining there is a match, a first signal to the kiosk computing device, the first signal authorizing the kiosk to release the secured resource, the secured resource including one of cash funds, a credit card, and a Subscriber Identity Module (SIM) card.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The proposed embodiments describe a system and method for providing members of a financial or other secure institution a mechanism by which to obtain emergency resources at an ATM or other institution-provided kiosk. In one example, the system allows a member who has lost valuable items, such as their wallet, phone, credit cards, and their government-issued identifications (IDs) to obtain emergency cash from an ATM. In order to access the cash, the member could provide one or both biometric information and a self-identifying passcode that they have memorized or is based on aspects of their identity that are known to them. In one example, the biometric information may be provided after the user enters an emergency command into the ATM machine to trigger the emergency mode. As a simple example, "1111" could be used as a code to inform the ATM that the user has lost everything and needs to enter a form of biometric authentication to start the emergency process. In some other examples, multiple codes may be available to members, each code representing a different avenue for authentication (e.g., 1111 can indicate a finger print ID is intended to be entered as the biometric information, 2222 could indicate a retina scan is intended to be entered as the biometric information, 3333 could indicate a voice ID is intended to be entered as the biometric information, etc.). In different embodiments, these initial input codes would not be printed or provided to the general public, but rather only to authorized users (members).

In some embodiments, after the biometric information has been successfully entered and authenticated, the ATM may require a long passcode. In some cases, the ATM can prompt the user in providing the passcode. For example, the ATM can ask the user to enter the numbers to their home address. Then the ATM could ask for their birthday, a preselected telephone number (like their work telephone number), and their institution PIN. This would result in a very long passcode that would be very difficult for an unauthorized user to guess. Once the user has been authenticated, the ATM can provide cash, a temporary credit card and/or a temporary telephone SIM card. The cards would be encoded and created by the ATM 'on the fly' using a blank stock of cards stored in the ATM.

Figure 1A:
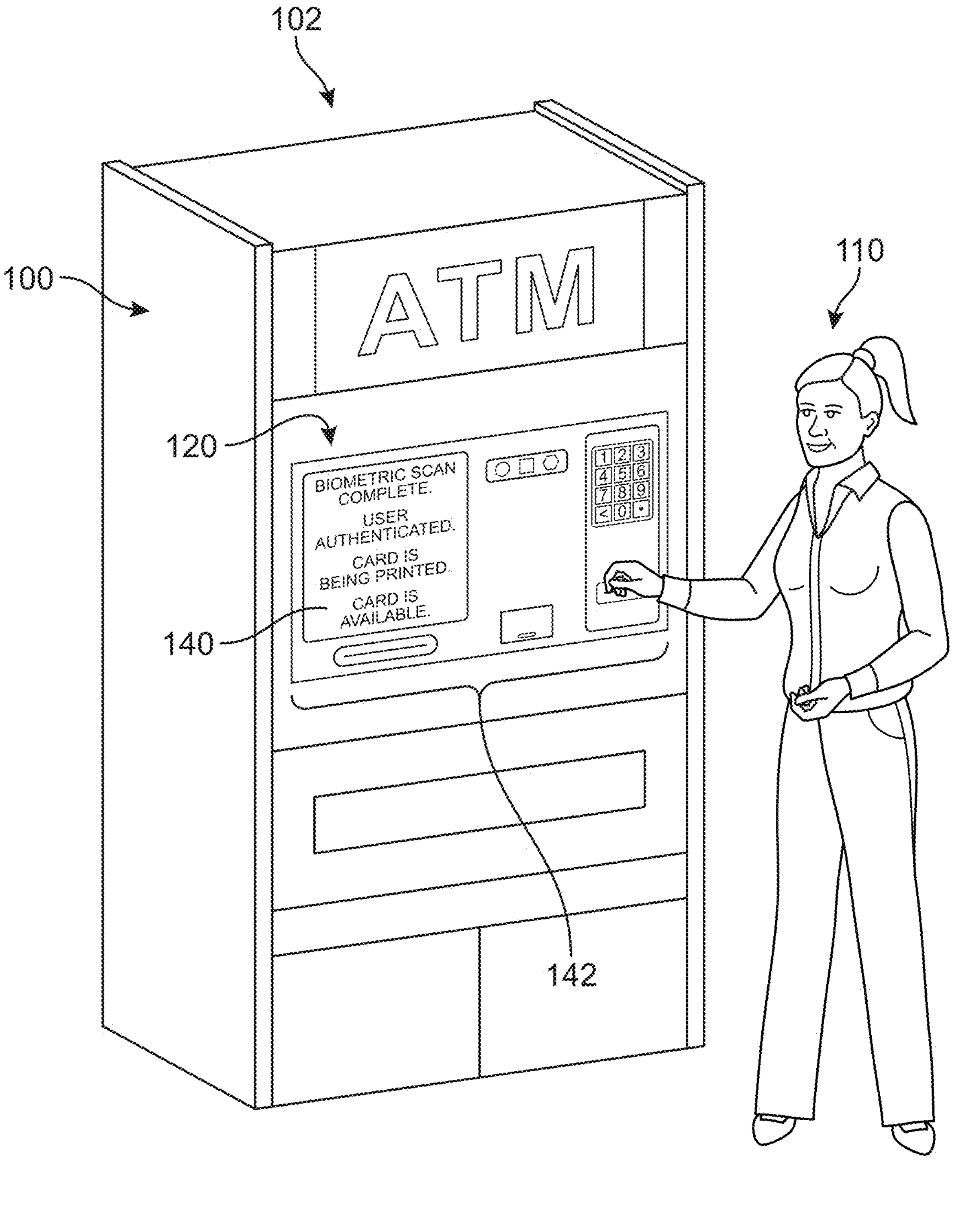
FIGS. 1A and 1B depict an example of a first person using an ATM kiosk to obtain access to a secured resource, according to an embodiment.

For purposes of introduction, an overview of one embodiment of the proposed systems and methods is illustrated with reference to FIGS. 1A and 1B. FIG. 1A depicts a first user 110, such as an account holder, approaching a banking kiosk 102 in which a first automated teller machine (ATM) 120 is installed. In different embodiments, kiosk 102 may comprise an enclosure 100 along with various components and resources that provide banking services for users. In some cases, kiosk 102 could be a stand-alone structure. In other cases, kiosk 102 could be part of a larger building or other structure. The enclosure may provide systems to facilitate banking or other secured-resource transactions. As seen in FIG. 1A, an exterior of the enclosure may include an access portal to the first ATM and components thereof. Some embodiments of the first ATM 120 may include components to provide videotelephony. In other cases, the first ATM 120 may be comprised of standard interactive features for viewing and accessing services related to banking. Thus, for purposes of this application, the term kiosk can be understood to be interchangeable with the terms enclosure and/or housing. It should be appreciated that while the system is envisaged for incorporation into standard ATMs, in other embodiments, an apparatus similar to an ATM may be specially provided by the institution and installed at various remote locations. Such a device could be employed to perform the same/similar operations and provide the same/similar features and benefits as the ATMs described herein.

In different embodiments, the kiosk 102 may communicate (via its computing system) with a server via a network. The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols. In some embodiments, the kiosk 102 can be connected to the network through a hardwire connection or wirelessly. Similarly, the server can be connected to a network via a hardwire connection or wirelessly. The server can be used to manage the activity of kiosk 102 and/or to send and receive information to and from kiosk 102. In many cases, the kiosk 102 is designed to be unmanned and/or operated remotely. Thus, kiosk 102 may be potentially operational at any time, and can host interactive sessions 24 hours per day, 7 days a week.

Furthermore, the functionality of first ATM 120 is provided by an interactive system that may be accessed by a user via a display screen 140 (or a projected image created by an image projecting device). The first ATM 120 may also include or be in communication with one or more slots for scanning, printing, or providing storage for documents, and/or other slots that may provide provisions for the occupant to deposit or withdraw funds in the form of paper money (and/or checks for deposits). Collectively, the display screen 140 and components configured for user interaction will be referred to as a user interface assembly 142.

Figure 1B:
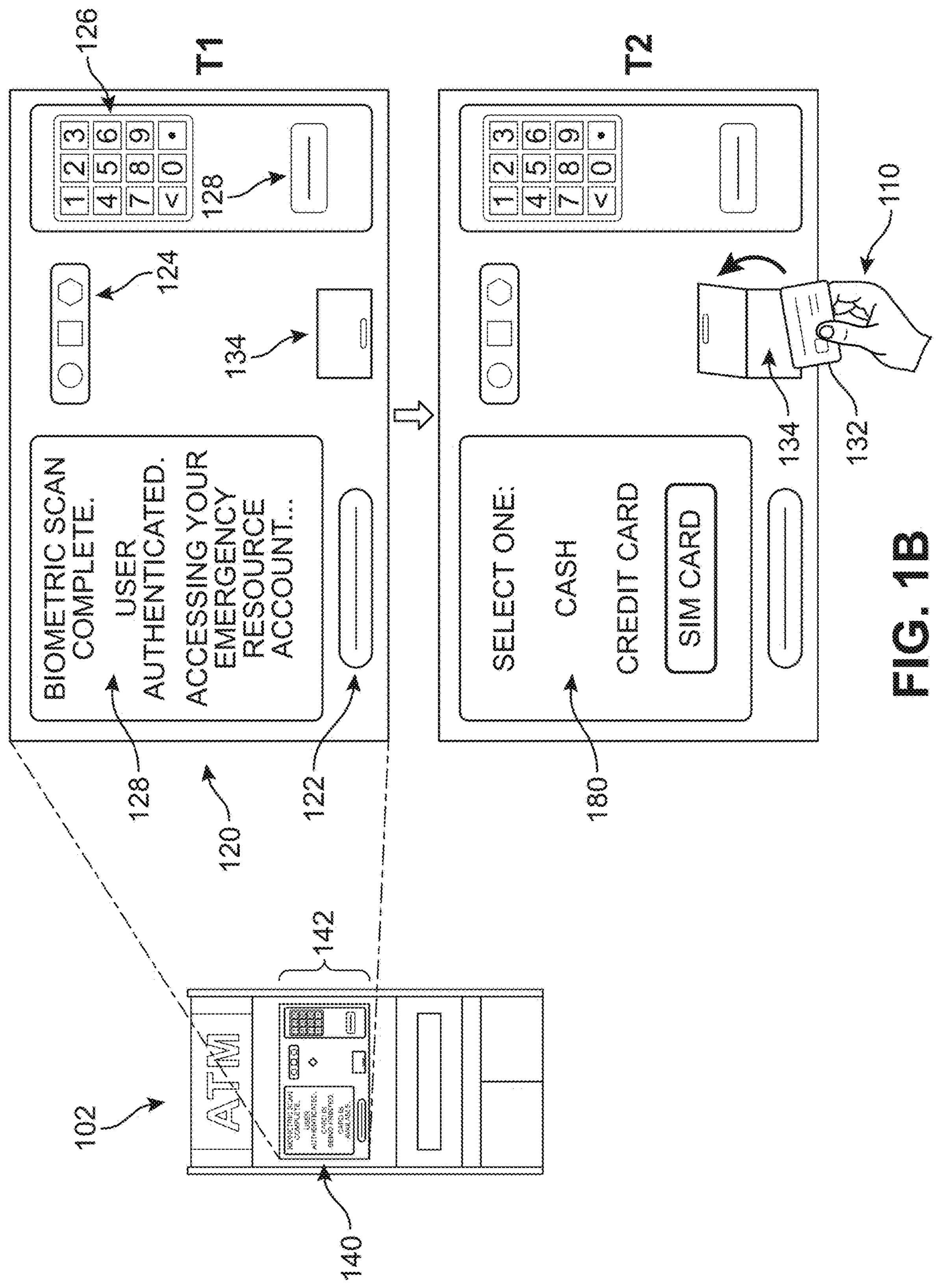

Referring to FIG. 1B, an isolated view of the kiosk 102 is presented, with the user interface assembly 142 shown in a magnified view at a first time T1 and at a second time T2. By first time T1, it can be understood that the first user 110 has requested access to a particular secured resource and underwent a biometric scan via one or more sensors 124, shown here as arranged in a sensor panel, such as a retinal scanner, fingerprint scanner, sound collection device for voiceprint analysis, and facial recognition image capture. In other examples, sensors 124 could include a camera and a microphone, for example. A camera may capture still or video images of a user that can be transmitted to a server or other party outside of kiosk 102. Likewise, microphones can capture audio that can be assessed to confirm the user's identity or for transmission to a party, such as an employee of a bank, outside of kiosk 102. In some embodiments, sensors 124 includes a motion sensor that detects movement in the area near the ATM 120.

The user interface assembly 142 can also include a keypad 126 by which a user can enter information (this may also or alternatively be provided by a touchscreen interface of the display screen 140), a card reader 128, and a dispenser 122 (e.g., for cash). In addition, in different embodiments, the kiosk 102 includes provisions for producing physical user account-specific SIM cards via a SIM card fabricator device that can reside in an interior compartment of the ATM. Once the first user 110 has been authenticated, as represented by a first message 128 ("Biometric scan complete. User authenticated. Accessing your emergency resource account . . . ") the user may select one of a set of options 180 (e.g., cash, credit card, SIM card, etc.). In this case, the user selects SIM card, and the system initiates encoding, linking, or production of a SIM card that will be associated with the user's account. In some embodiments, the SIM card can be pre-loaded with one or more phone numbers (phone book) that the user previously submitted as essential numbers they would like stored on a potential emergency SIM card. In some embodiments, the SIM card can be pre-loaded with data and/or minutes for enabling calls or usage as soon as the SIM card is installed in a computing device. A first SIM card 132 can then be ejected out of or otherwise released into a slot 134. At second time T2, the first user 110 reaches toward the slot 134 and acquires the first SIM card 132.

Thus, the first user 110, who may have lost their ID and phone is now in possession of a SIM card. It can be appreciated that in many locales, governments have mandated a registration process for obtaining a SIM card, including personal identification such as government-issued ID. If the person were to simply go to a mobile device store or another retailer to purchase a SIM card, and did not have their identification card available, they would not be able to proceed with the registration of the SIM card. However, with the present embodiments, the member is able to obtain a pre-registered SIM card that is ready for use.

Figure 2:
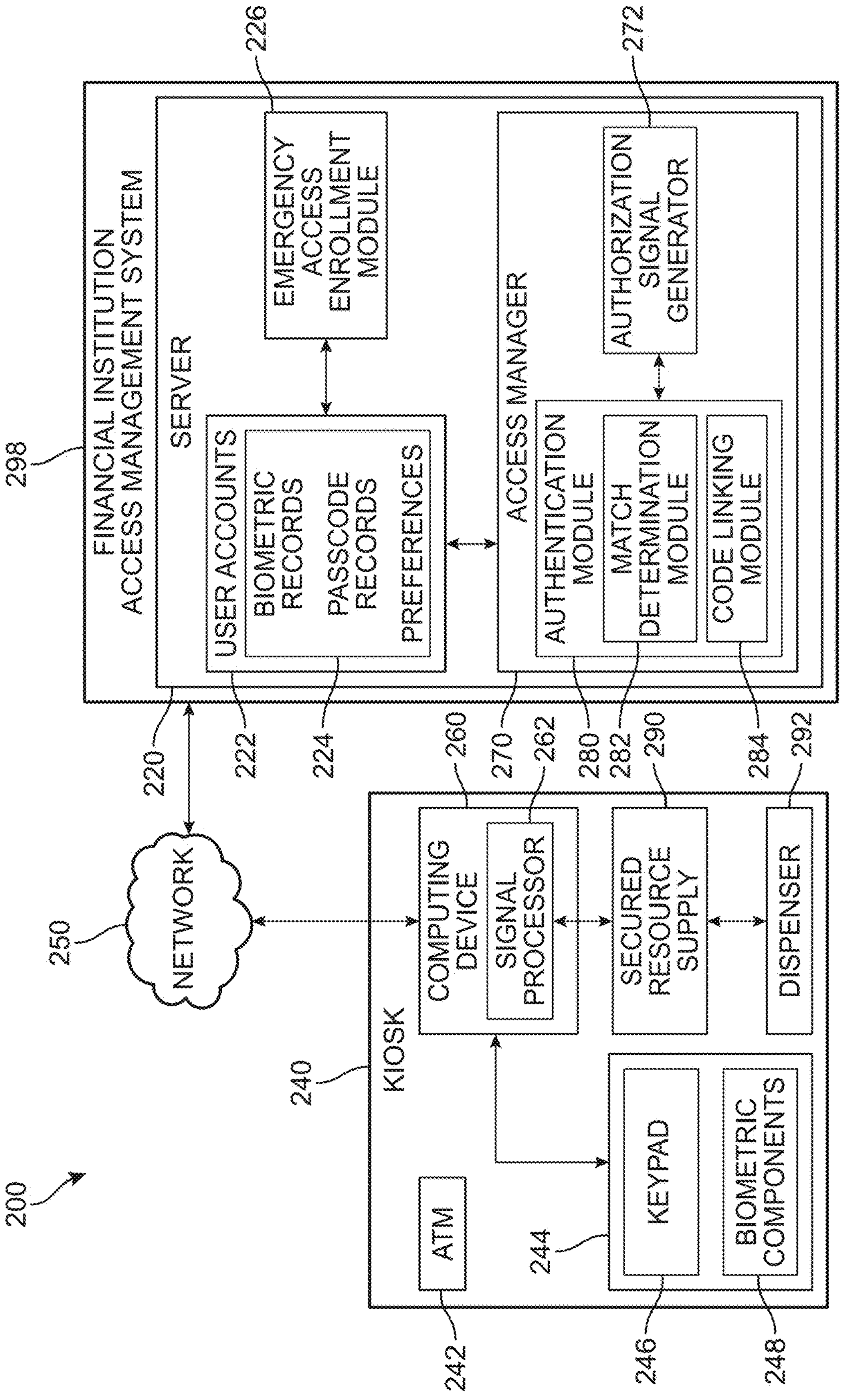
FIG. 2 is a schematic diagram of an environment for an emergency resource access management system, according to an embodiment.

In order to provide the reader with a greater appreciation of the embodiments, FIG. 2 depicts an embodiment of an environment 200 for an emergency resource access management system in which user data is captured and used to verify their identity for purposes of supplying the user with one or more secured resources. It should be understood that the environment 200 is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIG. 2. In this figure, the environment 200 includes a remote server 220 for an access management system 298 of (or employed by) the financial institution, and an on-site computing device 260, typically residing in a kiosk 240 associated with an ATM 242. It should be understood that the term "computer system" refers to the computing resources of a single computer, the partial computing resources of a single computer, a plurality of computers communicating with one another, or a network of remote servers. In one embodiment, computer device 260 includes at least one server having at least one processor.

In different embodiments, devices and components of environment 200 can communicate with each other and with other components of environment 200 over one or more networks (shown here as network 250). The network 250 may comprise any number of electronic devices and use any number of communication protocols to facilitate data communications within the network 250. One having skill in the art would appreciate that the network 250 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 250 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 250 may include a physical and/or logical architecture defined by firewalls, proxy servers, routers, switches, or similar features that implement various levels of security and my function as logical gateways or boundaries.

As noted earlier, the proposed systems and methods can be configured to verify a user's identity in order to authorize the supply of cash, credit cards, and/or SIM card with minimal user effort and offer a simplified, efficient, and ultimately highly convenient process by which to authorize and grant the user access to secured resources. Such systems can rely on device infrastructure that is already in place for video and image recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password/code or PIN; (b) user possession, typically provided by the secured system service, such as a physical key, smart card, CAC (Common Access Card), PIV card (Personal Identity Verification card), RSA, or other tangible card or token, magnetic stripe cards, certificates with a digital signature, computing device that is configured to receive a control signal, etc.; and (c) biometric factors, such as voice recognition, facial recognition, retinal and fingerprint scans, etc. It should be appreciated that the proposed embodiments make use of non-tangible factors that include (a) and (c), and can exclude (b), ensuring that the loss of such physical items will not prevent the user from accessing the emergency resource.

Furthermore, authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access.

In different embodiments, following a request from a user for a secured resource at the kiosk 240, an access manager 270 of system 298 can be configured to initiate an authentication event session in coordination with the computing device 260. It should be understood that although the access manager 270 and components thereof are shown as residing entirely in server 220, in other embodiments, one or more components of the access manager 270 can be stored on the local computing device 260, or at some other different or remote location.

In different embodiments, user inputs can be provided via one or more onboard interface and data collection devices 244. In some embodiments, the user-initiated request-such as a trigger access code entered via a keypad 246 associated with ATM 242—is transmitted via network 250 to the server 220, and can cause an activation response of the operation of the access manager 270. In different embodiments, there may be multiple access codes, and each access code corresponds to a specific biometric data type that will be used as the basis for the authentication. These access codes, and the biometric data type they are assigned to, can be stored in remote server 220 and/or locally at computing device 260. In one embodiment, the access manager 270 will initiate a process by an authentication module 280 which causes the necessary biometric reference data from the user to be collected via biometric components 248 associated with the ATM 242. As noted earlier, authentication of a person can be based on one or more types of data. For example, biometric data can be obtained by the computing device 260 via one or more biometric components 248 associated with the kiosk 240, including but not limited to devices that are designed to verify a user's identity through unique biological traits such as retinas, irises, voices, facial characteristics, and fingerprints. Thus, the term biometric components can also be referred to as biometric data capture devices or biometric input devices. Biometric authentication systems store this biometric data in order to verify a user's identity when that user accesses their account. Because this data is unique to individual users, biometric authentication is often considered more secure than traditional forms of multi-factor authentication. Biometric authentication is a security process that relies on the unique biological characteristics of an individual to verify that he is who he says he is. In different embodiments, biometric identifiers can be acquired and screened through fingerprint scanners, retina and/or iris recognition, voice detection, facial recognition, and/or liveness detection (e.g., when a biometric authentication system verifies that a captured image of a person is indeed that person in the flesh and not a still or flat image).

At around the same time, or before or after the biometric data collection, the user may be asked to enter their linked passcode. This passcode can be used by the system to locate the corresponding record for the purported member. In addition, the passcode can include specific sets of numbers that represent personal aspects of a user's life, such as but not limited to one or more of (a) house/business number/address, (b) phone number, (c) PIN number, (d) birthdate, (e) last four digits of their social security number, (f) zip code, (g) child/relative's birthdate, (h) PIN or other account-linked code, (i) unique ID number generated previously for this specific task, (j) the bank account number, etc. Thus, in discrete segments the user may be prompted to enter numbers based on each of these categories, and this sequence of numbers will be used to match the user to a particular user account record stored in user accounts 222 (e.g., via a code linking and verification module 284). The total passcode can thereby be surprisingly long (e.g., over 15-20 numbers or alphanumeric characters) and highly unlikely to be memorized by someone who is not the user, or copied by someone near the user. If a matching record exists (i.e., that aligns with the passcode entered by the user), the user's stored data 224 (e.g., biometric reference data, passcode data, as well as the user's preferences (e.g., a preferred manner of authentication, and what limitations or restrictions are to be imposed on the card)), are accessed from a record securely maintained in association with the user's account in the user account database 222. In some embodiments, only if the passcode is correctly entered within a limited number of tries will the user be permitted to proceed for a particular window of time. For example, the user may be limited to three tries every 12 hours, or five tries every 24 hours, to enter the correct sequence of passcodes.

In different embodiments, an authentication module 280 of the access manager 270 can receive captured biometric data. The match determination module 282, implementing biometric authentication technology, compares the captured biometric data to stored, confirmed authentic data (reference biometric data) accessed from user account database 222. The term biometric signal or biometric data refer to an identifier that is associated or linked to an individual human and serve as a reliable authentication factor. The biometric signal can be stored in a database and represent or be included in an authentication record that will be linked to the account of the person (including identification data) who participated in an identity verification training session (e.g., during a session provided or enabled by an emergency access enrollment module 226), and be made available for use by the system during subsequent authentication sessions. In general, biometric authentication works by comparing two sets of biometric data of the same biometric data type (e.g., retinal scan to another retinal scan, fingerprint to another fingerprint of the same finger, etc.), where the first one is preset by the owner of the device or account, while the second one belongs to a device visitor or person seeking to access the account. The match determination module 282 will make a decision, such that if the two sets of data match, the user can be authenticated and the process with continue.

It can be appreciated that, in different embodiments, the user may opt to provide biometric updates at different intervals. For example, the user may lose or gain weight, have surgery, be in an accident, or experience some other change that may affect the validity of the biometric data as previously stored, and therefore he/she may request to submit new data. This can occur at an on-site location for the financial institution in order to ensure the enrollment of data is authentic. In one embodiment, the credit card or secured resource account consent can be linked to an expiration date or period of time after which the participant will be required to renew their agreement to the service.

In different embodiments, image signal processing algorithms and/or software may be accessed by match determination module 282, for example when performing facial recognition. In one example, the image input can be cleansed and normalized by an image processing module. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual or haptic signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI platforms like Caffe, Torch and Theano who provide businesses access to powerful neural networks for processing of their information by AI techniques like deep learning, reinforcement learning and logistic regression, as well as TensorFlow, OpenAI, and BigSur. Thus, a real-time authentication factor such as a fingerprint, eyeprint/retinal scan can be compared to a previously acquired fingerprint (or eye) authentication template (biometric reference models).

In some embodiments, the captured biometric data is processed and models or representations of the image are built. These models are compared against one another. In different embodiments, one or both samples may be deemed unacceptable or unusable if the resultant input is too bright or too dark, or if there is too much noise (poor signal to noise ratio). If a sample is not acceptable the system may request an additional or further sample. If the data is acceptable or sufficient, a scoring occurs via the match determination module 282. In one example, the scoring process is analogous to "what is the probability that the data captured by the computing device 260 are the same as the verification reference sample that is stored in the user account database?" Thus, in some embodiments, the determination of a "match" is not necessarily based on the verification/reference sample directly or exactly matching, but rather on the two samples being substantially similar or sharing particular features. The returned score is evaluated against a threshold value to determine if it meets or exceeds the minimum acceptable score. If the score is determined to be successful, the process can continue. Otherwise, access is denied, or blocked pending further verification. In some embodiments, the system is configured to then automatically generate a message indicating an unauthorized attempt to access the service may have occurred. In some embodiments, this message can be automatically transmitted by a communication module to an account address for the registered user.

In different embodiments, once authentication is completed successfully, the access manager 270 can proceed by generating an authorization signal via authorization signal generator 272. The authorization signal generator 272 passes a signal to a signal processor 262 of computing device 260 that can trigger local access by the user to a secured resource supply 290, which can include one or more of cash, a credit card fabrication device (and blank stock credit cards), and/or SIM card supply or fabrication device with blank stock SIM cards. Depending on the availability of the resource in the kiosk 240, as well as the selection made by the user, the particular resource can then be released via a dispenser 292 for the user.

Thus, in some embodiments, the signal processor 262 can respond to the signal as a command/control signal to authorize release of various secured resources. This command can allow the ATM 242 to release cash to the user, or to initiate fabrication of a credit card via an onboard card fabrication device that will be linked to the user's account and encoded with their information, and/or initiate production of a SIM card that has been encoded for use by the user with their contact information and preloaded with data/call minutes.

In some embodiments, the computing device 260 can narrow of fine-tune the release of a secured resource based on user account information from the user account database 222. As noted earlier, the user accounts database 222 can include or have access to a content library that stores account data related to one or more users. The data may include, for a plurality of users, name, personal and professional details, user biometric data, current and past policy for the user, credit limit of users, among other details. In some embodiments, a user enrolling with the system (e.g., via emergency access enrollment module 226) may have selected one or more restrictions such as the cash limit that can be released to the user based on this process, the credit limit for the credit card that may be provided, and/or the data/minutes limit for the SIM card that may be obtained. Such restrictions can allow the user to better safeguard their resources to a level they are comfortable with. These "restriction rules" can be stored in the record for that user and can help determine what options should be presented to the user during the emergency session. For example, a user may have indicated a preference for a credit card that expires after 24 hours (time expiration). In another example, the user may indicate that the credit card should only be active while being used at merchants in a specific geographical area (geofencing). In yet another example, the user can specify the maximum amount of money that can be released as cash or a maximum limit on the credit card, regardless of whether their current account holds more money than the selected amount (max use). In some embodiments, the user can indicate that the SIM card to be provided only work for calls or messages to the preloaded phone numbers that have been added to their SIM card, or indicate a number of minutes or data that the SIM card cannot exceed. The user may also input one or more phone numbers (e.g., during enrollment or subsequent authentication sessions) that should be preloaded onto a SIM card that is requested during such an emergency situation, obviating the need for the user to recall important contact information for their family, friends, or other persons. In addition, in different embodiments, the system can require the application of one or more of these restrictions, or apply them as a default unless the user expresses a different preference.

Figure 3:
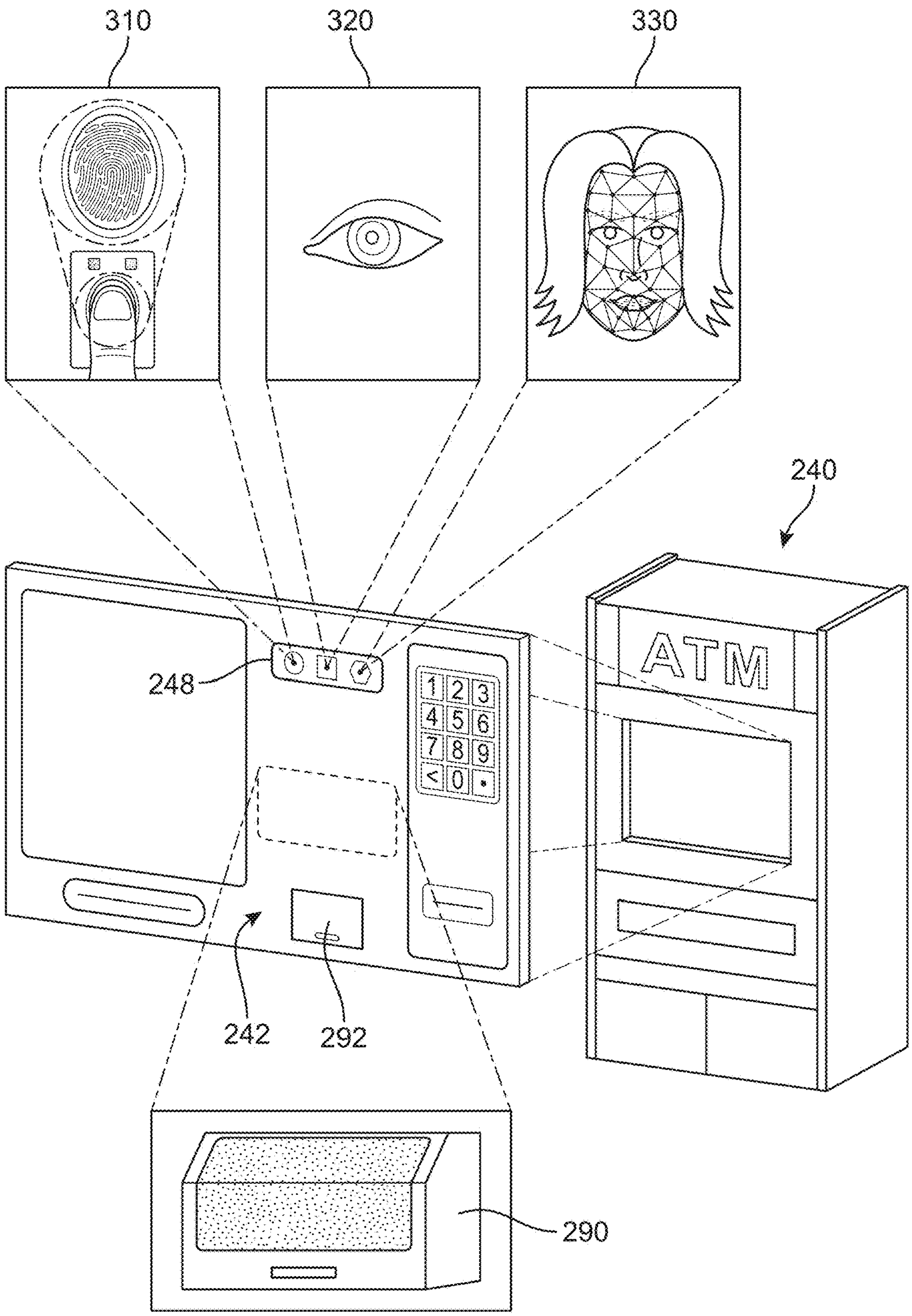
FIG. 3 is a schematic diagram depicting some biometric components for authentication of users to access secured resources, according to an embodiment.

Referring now to FIG. 3, an embodiment of kiosk 240 with ATM 242 is depicted. The kiosk 240 includes a panel in which input capture portions of biometric components 248 are arranged. For purposes of illustration, the biometric components 248 can be seen to include a fingerprint scanner 310 (for fingerprint recognition and/or finger geometric recognition), an eye scanner 320 (for iris recognition and/or retina recognition), and a facial recognition scanner 330. In other embodiments, other types of mechanisms to enable different biometric verification methods may be incorporated into the kiosk 240, including but not limited to voice recognition technology (e.g., voiceprint matching), ear identification technology, hand geometry recognition, vein recognition, and signature recognition technology. The input captured by one or more of these components can be received by the local computing device for processing and sent to the remote access manager. As noted earlier, during enrollment, via one or more of these types of components (scanners, sensors, and other readers) at a person's home or at a branch of the institution itself, a person's biometric data is captured and then stored in a database. The emergency resource access management system saves this information, such as a fingerprint, and converts it into digital data. Then, in the future, when the finger is placed on the kiosk scanner, the system compares the new data with what is stored in its database. Finally, the system will either confirm the person's identity and grant them access if there is a match or decline the request if not. The kiosk 240 further includes credit/SIM card fabrication device(s) 290, which are configured to receive instructions from the local computing device 260 (shown in FIG. 2) in order to prepare, encode, and produce a credit card and/or SIM card for the user. In some embodiments, once the card has been processed, the card can be dropped or pushed into the adjacent dispenser 292 for retrieval by the user.

Figure 4:
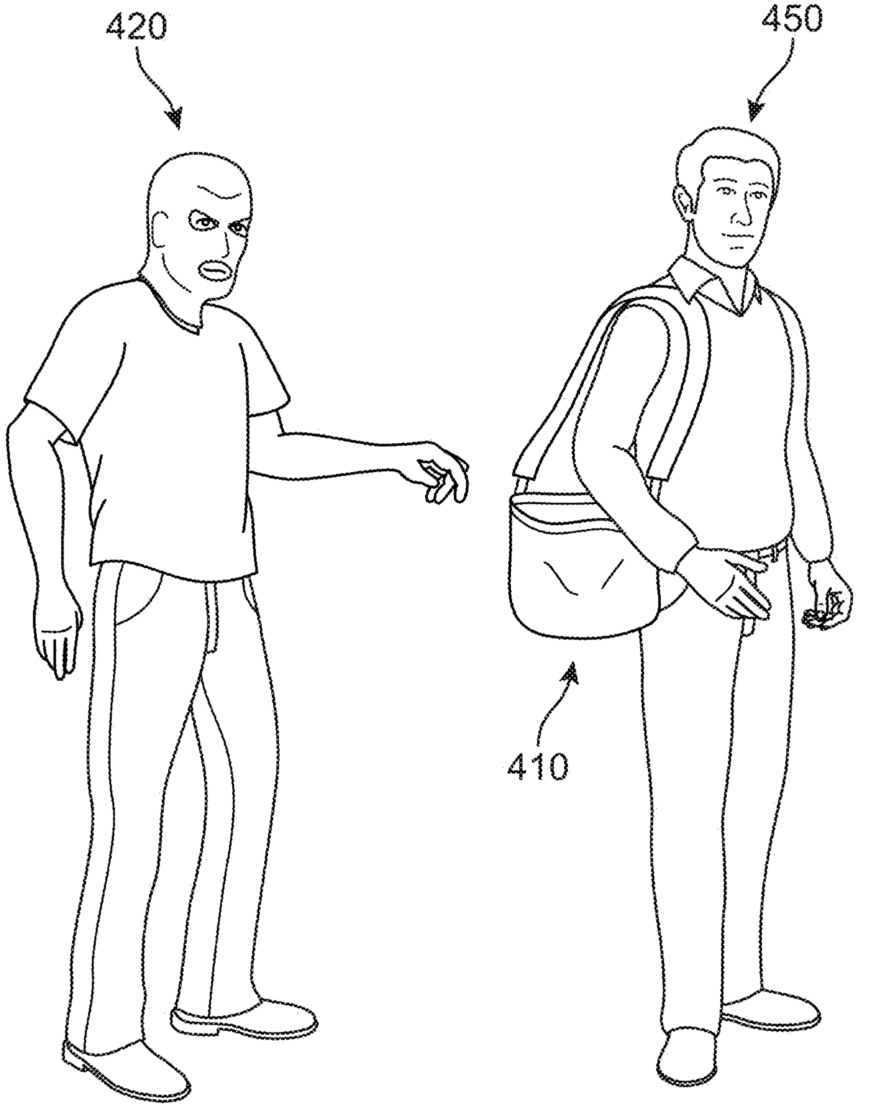
FIG. 4 is a representation of a second person being robbed of their valuables, according to an embodiment.
Figure 5:
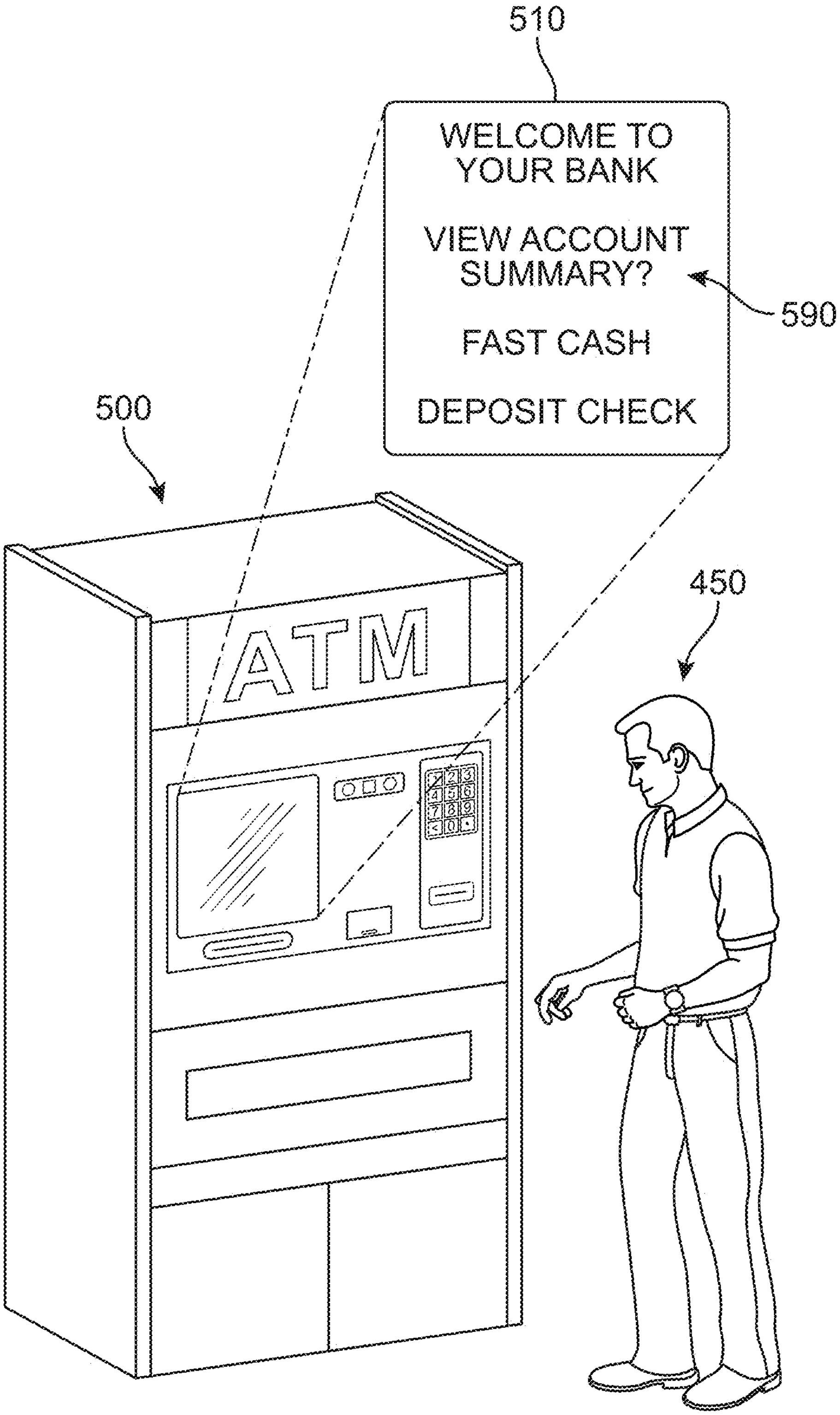
FIG. 5 depicts the second person approaching an ATM kiosk, according to an embodiment.
Figure 6:
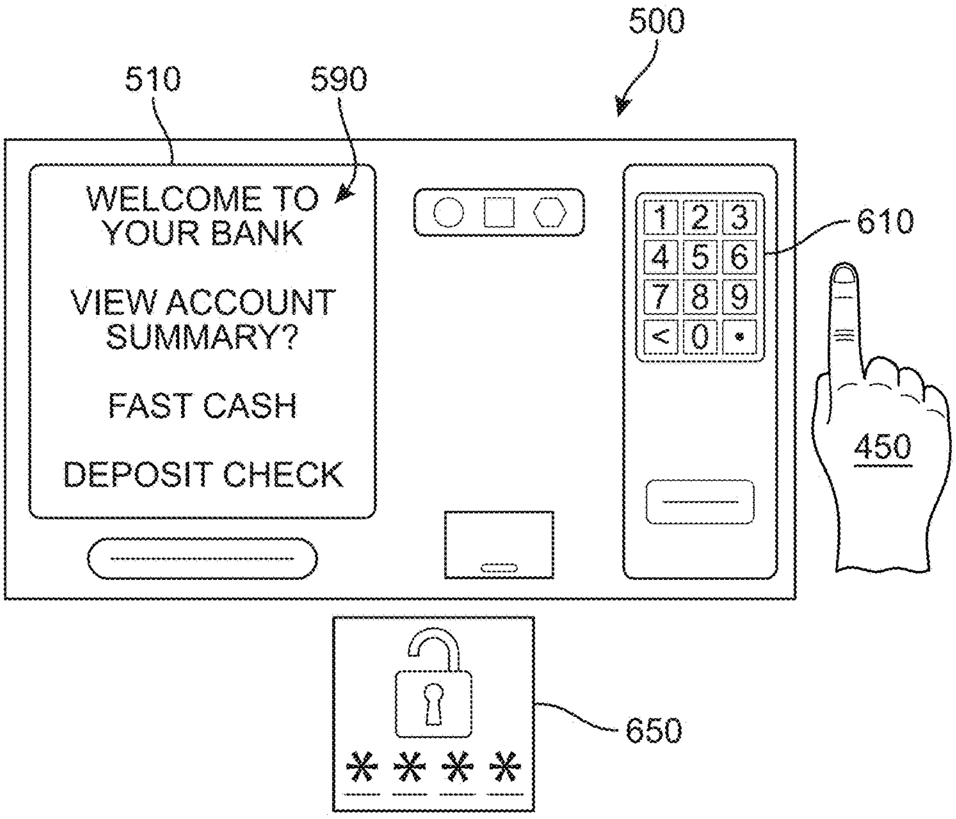
FIG. 6 depicts an example of an access code being used to trigger a change in operational modes, according to an embodiment.

FIGS. 4-12 present a sequence of drawings illustrating a scenario in which an embodiment of the proposed systems is implemented. In FIG. 4, an account holder 450 of a financial institution such as a bank or credit union (e.g., "ABC Bank") is out and pickpocketed during their excursion, losing their wallet (cash, credit cards, ID cards, etc.) and phone. Moving to FIG. 5, the account holder 450, having suffered this loss while traveling away from home, locates a nearby kiosk 500. A standard welcome screen 590 (e.g., Welcome to Your Bank. View Account Summary? Fast Cash? Deposit Check?") is shown on a display 510 of the kiosk 500. The account holder 450 is not able to move forward with any of these selections, as they lack the requisite ATM card. However, in different embodiments, they can instead request that the ATM transition to an emergency resource mode, as depicted in FIG. 6.

Figure 7:
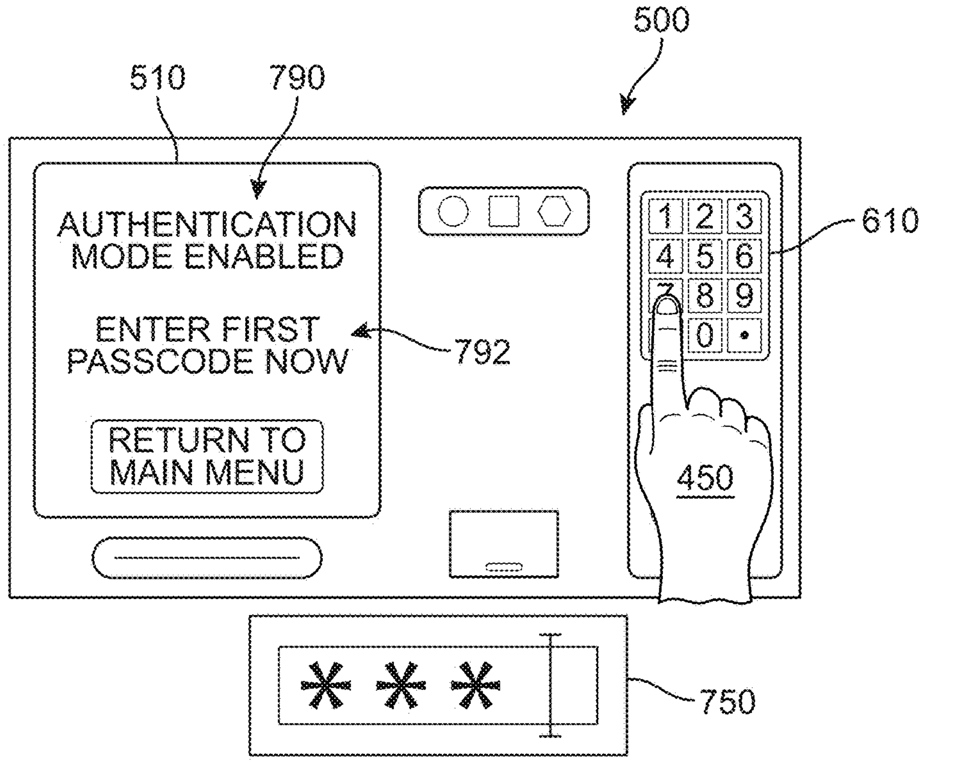
FIGS. 7 and 8 depict examples of an operational mode in which passcodes can be inputted, according to an embodiment.
Figure 8:
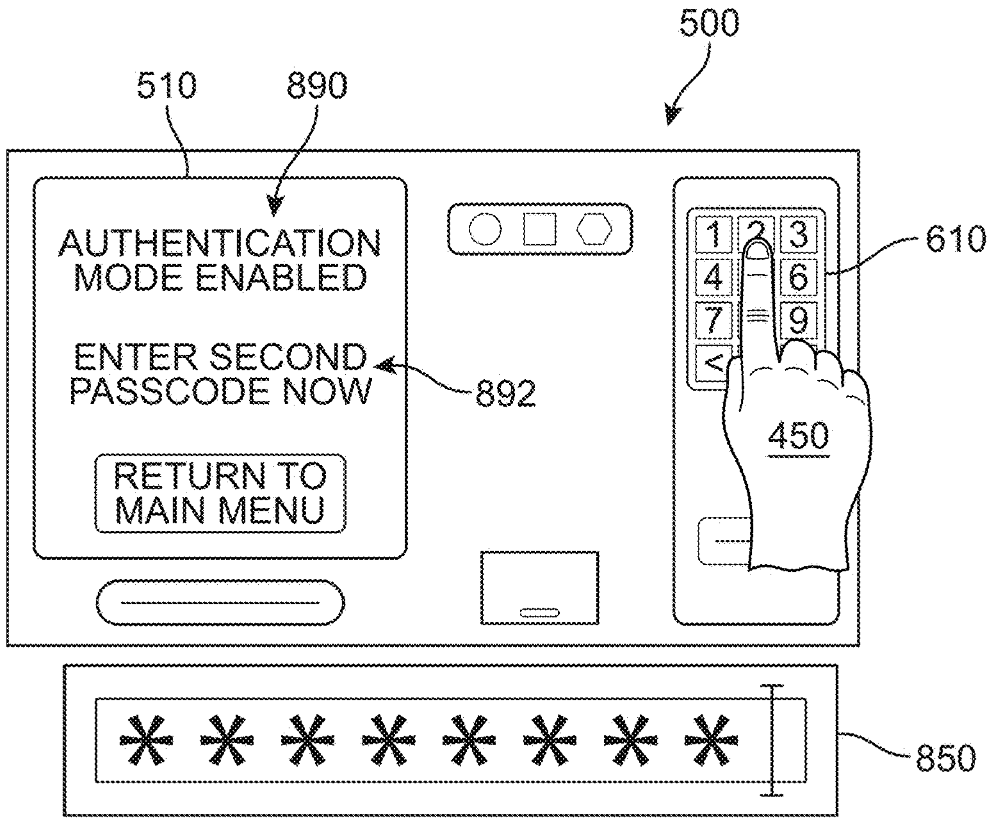

In FIG. 6, the account holder 450 taps a known-only-to-members initial access code 650 via numeric keypad 610, though in other embodiments, the touchscreen can include an input interface (e.g., an alphanumeric keypad) for this stage. Once the 'secret' code has been entered, the system verifies the code and switches to an authentication mode 790 in FIG. 7. The welcome screen or other standard options can be removed in a type of override of the standard ATM system, and a first prompt 792 is displayed that asks the user to enter the first part of their passcode. This first code 750 can for example, correspond to their address house number, zip code, PIN number, or some other easy-to-recall (for the individual user) sequence of numbers. As shown in FIG. 7, following successful receipt of the first code per confirmation message 890 ("first passcode received"), the system can display a second prompt 892 that asks the user to enter the second part of their passcode. This second code 850 can for example, correspond to their phone number, birthdate, or some other easy-to-recall sequence of numbers. In some embodiments, the prompts can specify what category of data should be entered (e.g., the display will indicate "Enter your phone number" rather than simply "Enter the second passcode"), while in other embodiments, the user will be required to remember what category/type of data should be entered in what order following each generic prompt in the sequence to increase security. The process shown in FIGS. 7 and 8 can be repeated until the pre-designated passcode has been correctly entered. Thus, the passcode can comprise a long string of different number sets that a person can nevertheless recall in the case of an emergency situation because each number set in the string is linked to a personal type of data that they already know.

In still other embodiments, an optional 'extra' or add-on safe code (also referred to as a duress alert code) may be inputted at the beginning of the string, or between each discrete number set. This safe code can be a specially designated code that, along with the combination of the user's presented information, can be used to subtly indicate the individual making the request is under duress. In one scenario, this person would be in a situation where they are being forced against their will to retrieve the emergency funds. In such a case, the user could—instead of presenting their combined information—could enter a sequence that provides notice of a state of duress. In another case, it may be possible for the individual under duress to present the correct sequence of information to trigger the creation of emergency resources as discussed herein, but then to also add a specific short code at the end. The addition of such extra key presses would equate to a signaling of their state of duress, and could be used as an opportunity to generate tagged, limited, or otherwise traceable resources. For example, where the safe code is known to indicate that the emergency resources would be used by someone who is not the authorized recipient, that resource could be purposefully designed (e.g., restricted amount of funds, cash that has been marked to track or limit its user, fake cash, credit card that is limited to under $50 and includes a tracking feature, a credit card that cannot be activated, a SIM card that is defunct, etc.) to give the appearance of success to the user while still limiting loss as they are forced to handover the money or other item of value that is obtained from the machine.

Figure 9:
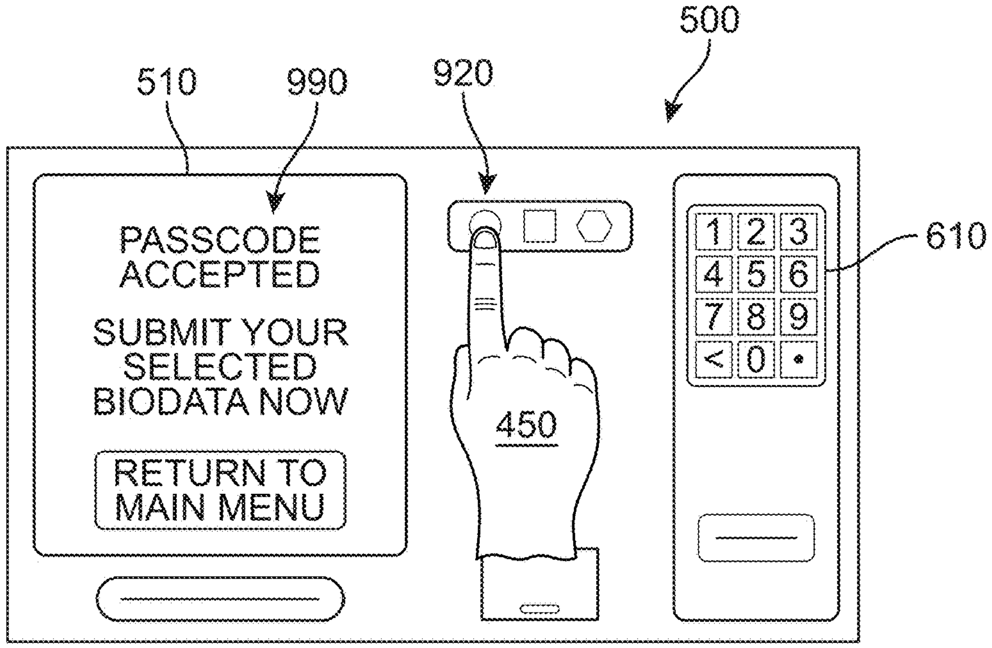
FIG. 9 is a depiction of biometric data being collected for purposes of authentication, according to an embodiment.
Figure 10:
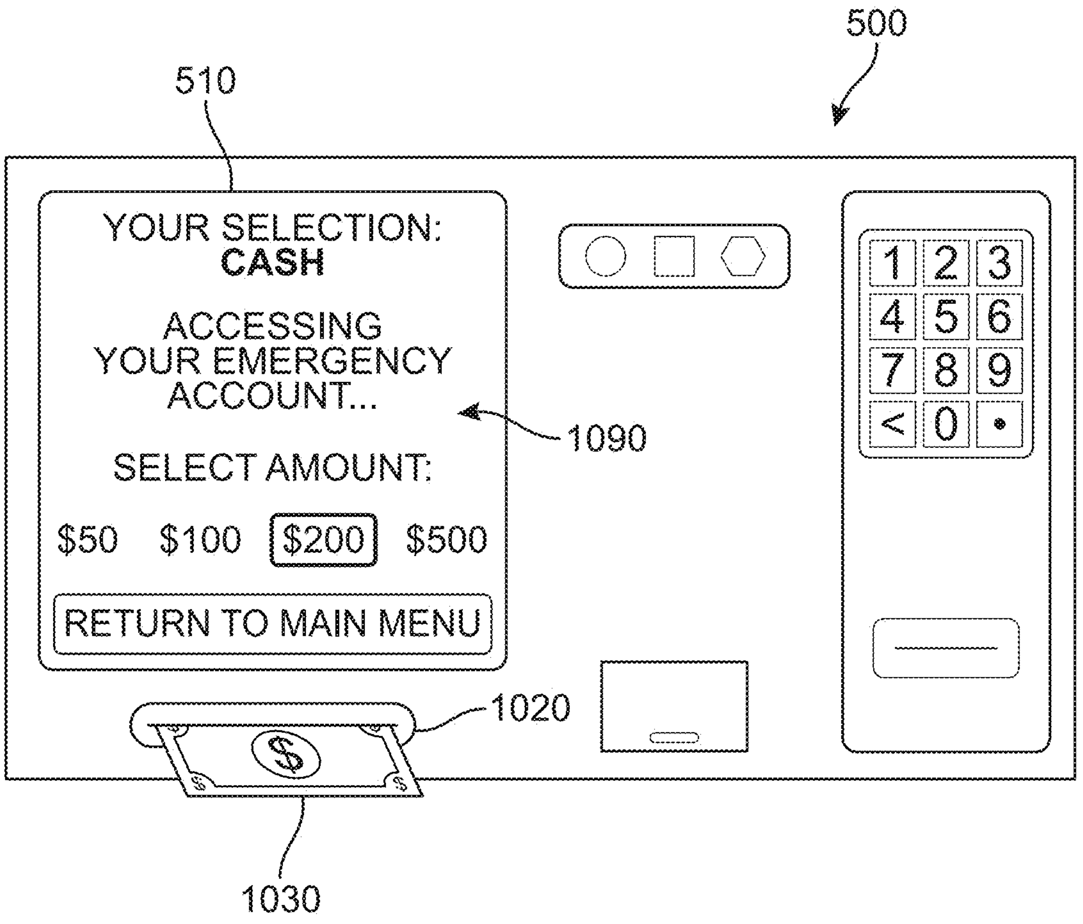
FIGS. 10, 11, and 12 present some examples of secured resources that can be supplied by the proposed systems, according to an embodiment.

Moving now to FIG. 9, with the passcode successfully entered, the account holder 450 can be asked to provide his/her biometric data via one or more biometric components 920 to allow the system identify the user with reference to the record linked to the submitted passcode and then authenticate if a match is confirmed. In some embodiments, the passcode is not needed for the record search and selection, as the system can receive the appropriate input (e.g., face, hand, voice, etc.) and search its entire account database to find a match.

In still another example, the initial access code 650 (e.g., see FIG. 6) can also be pre-linked to the required type of biometric data to further limit the search (e.g., there may be a set of initial access codes that each trigger the authentication mode, but require a different type of biometric data). Thus, a first access code can indicate that the user will be entering a voiceprint, a second access code can indicate the user will be entering a fingerprint, a third access code can indicate the user will be entering a retinal scan, etc. Thus, the system will 'know' in advance, based on the access code, that it should filter the total records that will be searched to only that type of biometric data. In some cases, the user will first input some form of data by keypad/user interface or voice to reduce processing time and the amount of computational resources by limiting the match determination to a pre-defined target account. In some embodiments, only the user will know based on their earlier enrollment session what type of biometric data they had submitted for registration with the system, and thus will know what type of biometric data should now be submitted. Thus, as an additional layer of security, if the person tries to provide a different type of biometric data (e.g., fingerprint via the kiosk's fingerprint scanner) than that which was stored on their account (e.g., retinal scan), a flag can be generated to the bank and the user's contact information indicating a potential fraudulent attempt to access the secured resource because the user is trying to submit data via the fingerprint scanner rather than the retinal scanner.

Figure 11:
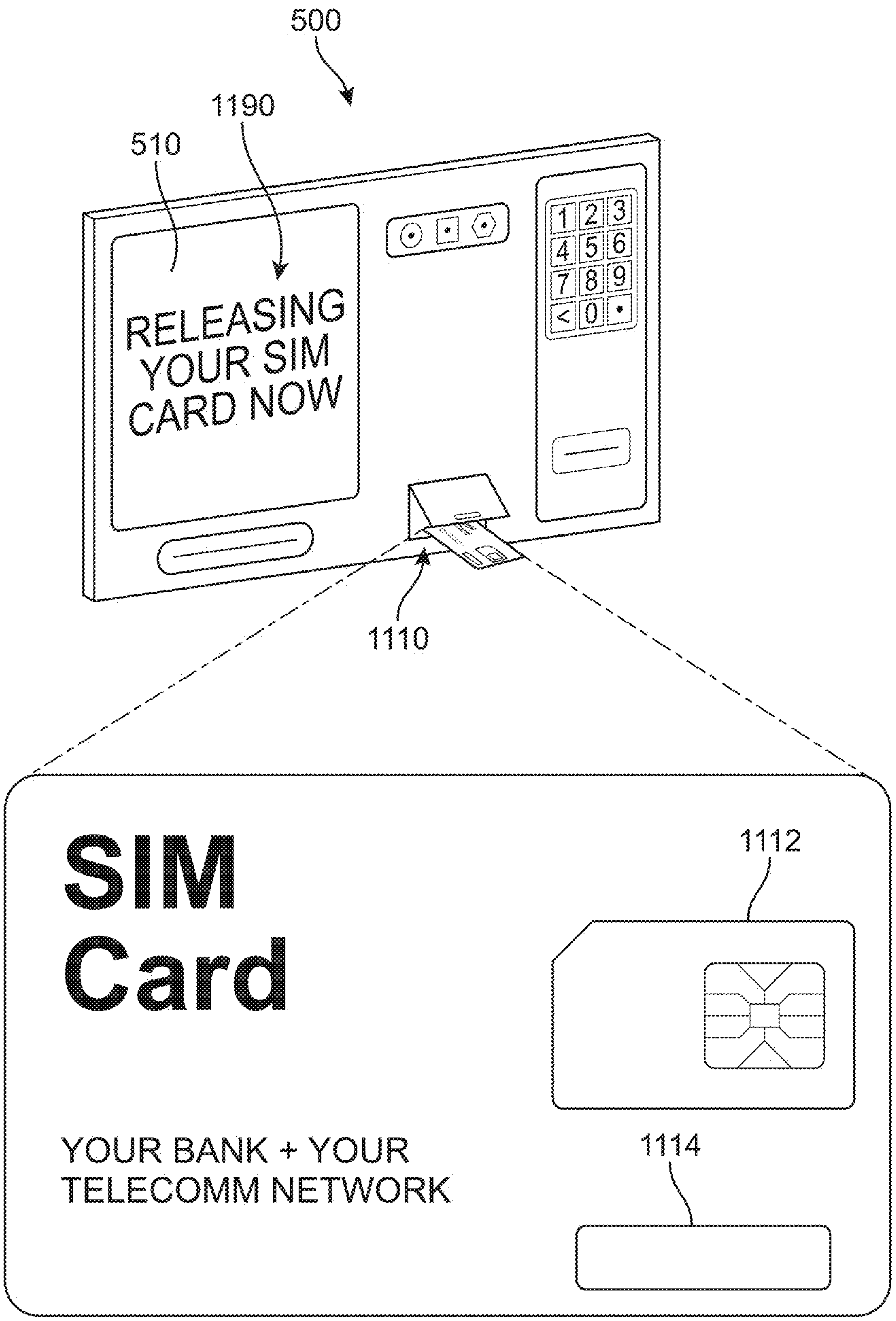
Figure 12:
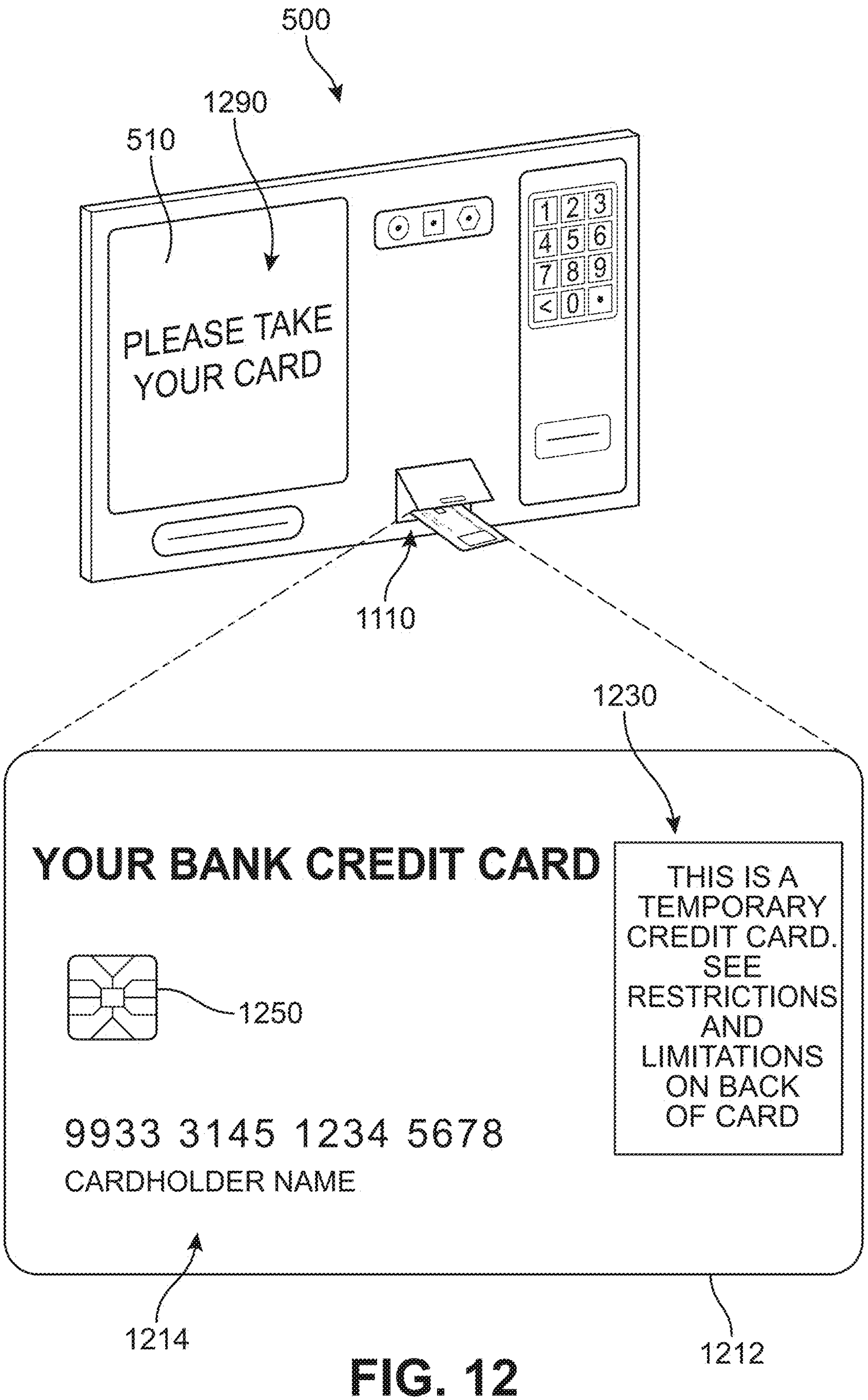

In different embodiments, the biometric data collected by the kiosk 500 can be transmitted to the remote server (e.g., see FIG. 2) which can determine if the data matches the user record. If the system determines the biometric record matches the acquired data, the user can be authenticated. In such a case, a command is sent from the server to the computing system for the kiosk 500 to authorize release of the selected secured resource. For example, in a first scenario shown in FIG. 10, the user may select the cash option. A first resource message 1090 is now shown on display 510. Once the user finalizes their choice (e.g., how much money), the kiosk 500 processes the release of cash 1030 via a standard ATM dispenser 1020, and the session can end. In FIG. 11, an alternative scenario (or additionally following the release of cash, where the user continues the session) in which the user selected the SIM card option is shown. A second resource message 1190 is now shown on display 510. Once the user finalizes their choice, the kiosk 500 processes the fabrication and/or encoding of a SIM chip 1112 with a unique registration 1114 via a dispenser slot 1110, and the session can end. The SIM (subscriber identity/identification module) chip 1112 or other smartcard/memory chip can be understood to refer to a silicon integrated circuit configured to securely store an international mobile subscriber identity number and its related key, which are used to identify and authenticate subscribers on mobile telephony devices. Similarly, in FIG. 12, an alternative scenario (or additionally following the release of cash and/or SIM card, where the user continues the session) in which the user selected the credit card option is shown. A third resource message 1290 is now shown on display 510. Once the user finalizes their choice, the kiosk 500 processes the fabrication and/or encoding of a credit card 1212 with a credit account pre-linked to the user's bank via the dispenser slot 1110, and the session can end. In some embodiments, the credit card 1212 can be pre-activated to facilitate the usage of the card in cases where the user no longer has their phone.

Thus, in different embodiments, the credit card 1212 can include features standard on such cards, such as a chip 1250, cardholder information 1214 (e.g., name of cardholder, account number of cardholder, a magstripe, company contact information, etc.), and institution name (e.g., "ABC Bank Debit Card"). In some embodiments, additional information such as message 1230 may be printed or attached as a decal to a surface of the card that alerts the carrier that the card is highly limited in its functions ("This is a temporary credit card. See restrictions and limitations on back of card"). In one embodiment, the specific preferences/system settings regarding the card's limitations will be pre-printed or otherwise presented on one side of the card.

Figure 13:
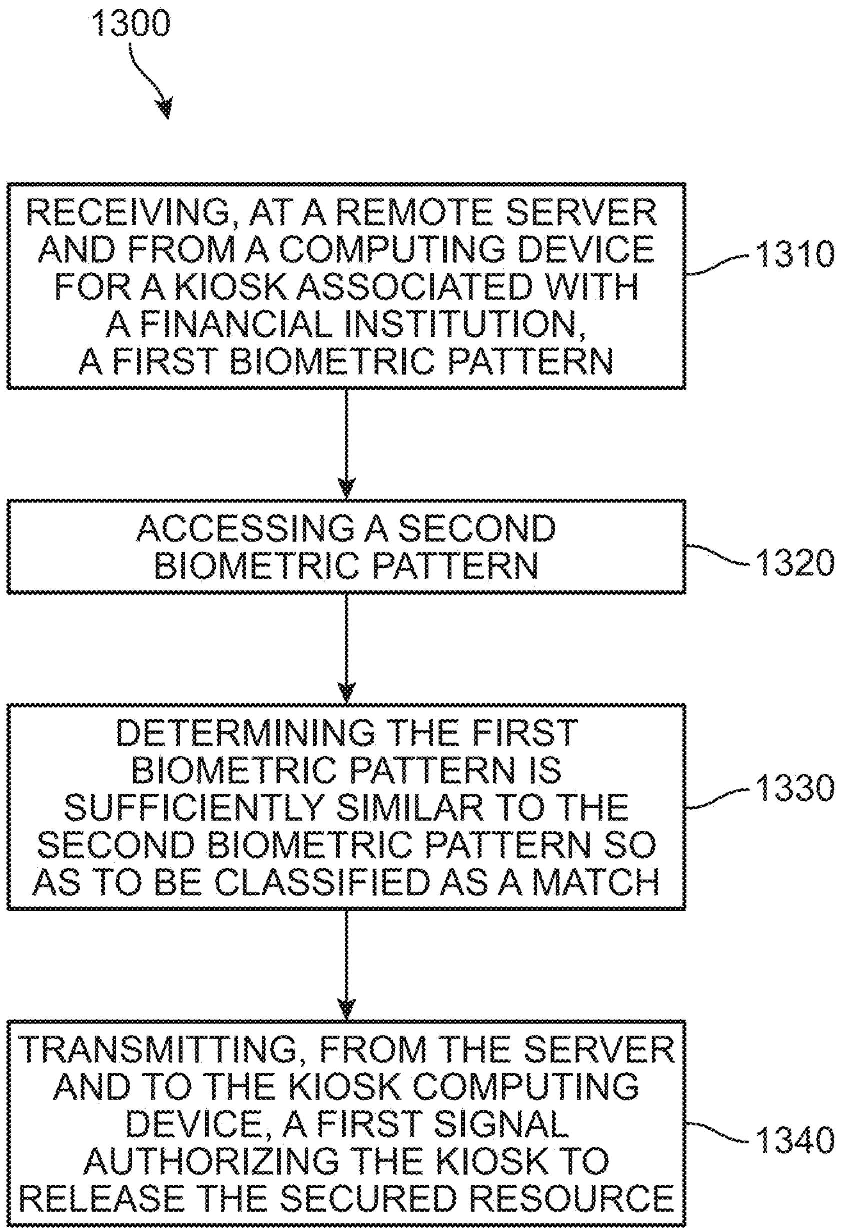
FIG. 13 is a flow chart depicting a process of providing emergency access to a secured resource, according to an embodiment.

FIG. 13 is a flow chart illustrating an embodiment of a computer-implemented method 1300 of providing emergency access to a secured resource. The method 1300 includes a first step 1310 of receiving, at a remote server and from a computing device for a kiosk associated with a financial institution, a first biometric pattern, and a second step 1320 of accessing, via the server and in response to receiving the first biometric pattern, a second biometric pattern stored in a member record. A third step 1330 includes determining, at the server, the first biometric pattern is sufficiently similar to the second biometric pattern so as to be classified as a match. In addition, a fourth step 1340 includes transmitting, from the server and in response to determining there is a match, a first signal to the kiosk computing device, the first signal authorizing the kiosk to release the secured resource, the secured resource including one of cash funds, a credit card, and a Subscriber Identity Module (SIM) card.

In other embodiments, the method may include additional steps or aspects. In one embodiment where the secured resource is the SIM card, the method can also include pre-registering, via the computing device and the card fabrication apparatus, the SIM card to a member account linked to the first biometric pattern before the SIM card is released. In another example, the method includes automatically pre-loading one or more phone numbers into a memory of the SIM card before the SIM card is released, the one or more phone numbers having been stored in the member record. For example, there may have been a prior step of receiving, at the server, the phone numbers from the user during their enrollment. In some embodiments, the method includes automatically loading prepaid data and/or call minutes onto the SIM card before the SIM card is released.

In other embodiments where the secured resource is the credit card, the method can also include registering the credit card with a member account linked to the first biometric pattern before the credit card is released. In one example, the credit card is automatically assigned a credit limit based on either an amount of funds currently available in a bank account registered to the member account or an amount selected by an authorized user of the member account. In another example where the secured resource is the cash funds, the method can also include steps of releasing a first amount of the cash funds from a dispenser slot in the kiosk in response to the first signal, and automatically debiting the first amount from a bank account registered to a member account linked to the first biometric pattern.

In different embodiments, the first biometric pattern is captured via a biometric input device installed in the kiosk and connected to the kiosk computing device, and the first biometric pattern is one of a retinal scan, fingerprint scan, facial scan, hand scan, and voiceprint.

In some embodiments, the method can also include steps of presenting a first menu on a display for the kiosk, the first menu related to services provided by an ATM housed in the kiosk; receiving, at the computing device, a first access code; automatically switching the computing device from a first operational mode associated with ATM services to a second operational mode associated with secured resource emergency access services; and presenting, on the display, a prompt that replaces the presentation of the first menu, the prompt requesting input of a passcode. In one embodiment, the passcode is based on a sequence of member-specific personal data including one or more of member birthdate, address, zip code, phone number, and PIN code Other methods can also be contemplated within the scope of this disclosure. For example, a computer-implemented method of providing emergency access to a secured resource can include a first step of transmitting, from a computing device for a kiosk associated with a financial institution to a remote server, a first biometric pattern, and a second step of receiving, from the remote server and at the computing device, a first signal authorizing the kiosk to release the secured resource based on the first biometric pattern matching a second biometric pattern stored in a member account, the secured resource including one of a credit card and a Subscriber Identity Module (SIM) card. A third step can include automatically registering (via the computing device or remote server) the secured resource to the member account associated with the first biometric pattern, and a fourth step includes releasing the registered secured resource from a dispenser slot of the kiosk.

In other embodiments, the method may include additional steps or aspects. In one embodiment, the method also includes steps of presenting a first menu on a display for the kiosk, the first menu related to services provided by an ATM housed in the kiosk; receiving, at a computing device for a kiosk associated with a financial institution, a first access code; determining, at the computing device, that the first access code corresponds to a request to switch the computing device from a first operational mode associated with ATM services to a second operational mode associated with secured resource emergency access services; automatically switching the computing device from a first operational mode associated with ATM services to a second operational mode associated with secured resource emergency access services; presenting, on the display, a prompt that replaces the presentation of the first menu, the prompt requesting input of a passcode; receiving, at the computing device, the passcode; accessing, via the computing device, a member record based on the passcode, the member record including at least a first biometric profile of a first biometric data type and a second biometric profile of a second biometric data type; selecting the first biometric profile from the member record based on the first access code; requesting, at the computing device, input corresponding to biometric data of the first biometric data type; and/or obtaining, at the kiosk, biometric data.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device (s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term “computing system” encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network (“LAN”) and a wide area network (“WAN”), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing emergency access to a secured resource, the method comprising:

presenting a first menu on a display for a kiosk, the first menu related to Automated Teller Machine (ATM) services provided by the kiosk during a first operational mode, wherein access to the services of the first operational mode is initiated via a physical credential;

receiving, at a computing device for the kiosk and in an absence of the physical credential, an emergency access code input by a user via a numeric keypad of the kiosk, wherein the emergency access code corresponds to a predetermined biometric data type;

in response to receiving the emergency access code, automatically switching the computing device from the first operational mode to a second operational mode associated with secured resource emergency access services, wherein the second operational mode replaces the first menu with a prompt requesting authentication input, and wherein the secured resource emergency access services of the second operational mode are limited relative to the ATM services of the first operational mode by one or more restriction rules stored in a member record, the one or more restriction rules including at least one of a cash limit, a credit limit, a time expiration, or a geographic restriction;

receiving, during the second operational mode and at a remote server and from the computing device for the kiosk associated with a financial institution, a first biometric pattern captured by a biometric input device of the kiosk, the first biometric pattern being of the predetermined biometric data type;

accessing, via the server and in response to receiving the first biometric pattern, a second biometric pattern stored in the member record;

determining, at the server, the first biometric pattern is sufficiently similar to the second biometric pattern so as to be classified as a match;

transmitting, from the server and in response to determining there is a match, a first signal to the kiosk computing device, the first signal authorizing the kiosk to release the secured resource; and transmitting, from the kiosk computing device and in response to receiving the first signal, a control signal to a dispenser to release the secured resource, the secured resource including one of cash funds, a credit card, and a Subscriber Identity Module (SIM) card.

2. The method of claim 1, wherein the emergency access code is provided only to authorized members of the financial institution and is not presented on the display of the kiosk.

3. The method of claim 1, wherein the secured resource is the SIM card, and the method further comprises:

pre-registering the SIM card to a member account linked to the first biometric pattern before the SIM card is released; and automatically pre-loading one or more phone numbers into a memory of the SIM card before the SIM card is released, the one or more phone numbers having been stored in the member record.

4. The method of claim 3, further comprising automatically loading prepaid data and/or call minutes onto the SIM card before the SIM card is released.

5. The method of claim 1, wherein the secured resource is the credit card, and the method further comprises registering the credit card with a member account linked to the first biometric pattern before the credit card is released.

6. The method of claim 5, wherein the credit card is automatically assigned a credit limit based on either an amount of funds currently available in a bank account registered to the member account or an amount selected by an authorized user of the member account.

7. The method of claim 1, further comprising:

presenting, on the display during the second operational mode, a prompt requesting input of a passcode;

receiving, at the computing device, the passcode, wherein the passcode is based on a sequence of member-specific personal data including at least one of a birthdate, an address, a zip code, or a phone number; and wherein receiving the first biometric pattern at the remote server occurs subsequent to the computing device receiving the passcode.

8. The method of claim 1, further comprising:

automatically registering the secured resource to a member account associated with the second biometric pattern before the secured resource is released; and in response to receiving the first signal at the kiosk computing device:

retrieving a blank card from a secured resource supply within the kiosk; and fabricating, via an onboard card fabrication device, the secured resource by encoding the blank card with account information associated with the member record to create one of a credit card or a Subscriber Identity Module (SIM) card; and dispensing the fabricated secured resource from the kiosk.

9. The method of claim 7, wherein the computing device permits entry of the passcode only within a limited number of attempts within a predetermined window of time.

10. The method of claim 9, wherein the passcode further includes a PIN code, and wherein the computing device permits entry of the passcode only within a limited number of attempts within a predetermined window of time.

11. A system for providing emergency access to a secured resource, the system comprising a processor and machine-readable media including instructions which, when executed by the processor, cause the processor to:

present a first menu on a display for a kiosk, the first menu related to Automated Teller Machine (ATM) services provided by the kiosk during a first operational mode, wherein access to the services of the first operational mode is initiated via a physical credential;

receive, at a computing device for the kiosk and in an absence of the physical credential, an emergency access code input by a user via a numeric keypad of the kiosk, wherein the emergency access code corresponds to a predetermined biometric data type;

in response to receiving the emergency access code, automatically switch the computing device from the first operational mode to a second operational mode associated with secured resource emergency access services, wherein the second operational mode replaces the first menu with a prompt requesting authentication input, and wherein the secured resource emergency access services of the second operational mode are limited relative to the ATM services of the first operational mode by one or more restriction rules stored in a member record, the one or more restriction rules including at least one of a cash limit, a credit limit, a time expiration, or a geographic restriction;

receive, during the second operational mode and at a remote server and from the computing device for the kiosk associated with the financial institution, a first biometric pattern captured by a biometric input device of the kiosk, the first biometric pattern being of the predetermined biometric data type;

access, via the server and in response to receiving the first biometric pattern, a second biometric pattern stored in the member record;

determine, at the server, the first biometric pattern is sufficiently similar to the second biometric pattern so as to be classified as a match; and transmit, from the server and in response to determining there is a match, a first signal to the kiosk computing device, the first signal authorizing the kiosk to release the secured resource; and transmit, from the kiosk computing device and in response to receiving the first signal, a control signal to a dispenser to release the secured resource, the secured resource including one of cash funds, a credit card, and a Subscriber Identity Module (SIM) card.

12. The system of claim 11, wherein the first biometric pattern is of the predetermined biometric data type.

13. The system of claim 11, wherein the secured resource is the SIM card, and wherein the instructions further cause the processor to pre-register the SIM card to a member account linked to the first biometric pattern before the SIM card is released and automatically pre-load one or more phone numbers into a memory of the SIM card before the SIM card is released, the one or more phone numbers having been stored in the member record.

14. The system of claim 12, wherein the instructions further cause the processor to automatically load prepaid data and/or call minutes onto the SIM card before the SIM card is released.

15. The system of claim 11, wherein the secured resource is the credit card, and the instructions further cause the processor to register the credit card with a member account linked to the first biometric pattern before the credit card is released.

16. The system of claim 11, wherein the instructions further cause the processor to:

present, on the display during the second operational mode, a prompt requesting input of a passcode;

receive, at the computing device, the passcode, wherein the passcode is based on a sequence of member-specific personal data including at least one of a birthdate, an address, a zip code, or a phone number.

17. The system of claim 16, wherein the computing device permits entry of the passcode only within a limited number of attempts within a predetermined window of time.

18. A system for providing emergency access to a secured resource, the system comprising a kiosk comprising:

a display;

a physical credential reader;

an access code input device comprising a numeric keypad;

a biometric input device;

a dispenser; and a first computing device including a first processor and a first memory; and a remote server communicatively coupled to the kiosk, the remote server comprising a second processor and a second memory storing member records including a second biometric pattern;

wherein the first processor is configured to:

cause the display to present a first menu related to Automated Teller Machine (ATM) services during a first operational mode, wherein access to the services of the first operational mode is initiated via the physical credential reader;

receive, via the access code input device and in an absence of the physical credential, an emergency access code, wherein the emergency access code corresponds to a predetermined biometric data type;

in response to receiving the emergency access code, automatically switch from the first operational mode to a second operational mode associated with secured resource emergency access services, wherein the second operational mode replaces the first menu with a prompt requesting authentication input, and wherein the secured resource emergency access services of the second operational mode are limited relative to the ATM services of the first operational mode by one or more restriction rules stored in a member record, the one or more restriction rules including at least one of a cash limit, a credit limit, a time expiration, or a geographic restriction; and during the second operational mode, cause the biometric input device to capture a first biometric pattern and transmit the first biometric pattern to the remote server, wherein the first biometric pattern is of the predetermined biometric data type;

wherein the second processor is configured to:

receive, from the kiosk, the first biometric pattern;

access, from the second memory, the second biometric pattern stored in the member record;

determine the first biometric pattern is sufficiently similar to the second biometric pattern so as to be classified as a match; and transmit, in response to determining there is a match, a first signal to the kiosk, the first signal authorizing the kiosk to release the secured resource;

wherein the first processor is further configured to, in response to receiving the first signal, transmit a control signal to the dispenser to release the secured resource, the secured resource including one of cash funds, a credit card, and a Subscriber Identity Module (SIM) card.

19. The system of claim 18, wherein the first biometric pattern is of the predetermined biometric data type.

20. The system of claim 18, further comprising an onboard card fabrication device, wherein the first processor is further configured to, in response to receiving the first signal, cause the onboard card fabrication device to retrieve a blank card from a secured resource supply within the kiosk and encode the blank card with account information associated with the member record to create the secured resource.

* * * * *